United States Patent [19]

Lewis

[11] 4,286,550
[45] Sep. 1, 1981

[54] FUEL ADDITIVE INJECTION DEVICE

[76] Inventor: Arlin C. Lewis, Box AU, Libby, Mont. 59923

[21] Appl. No.: 30,047

[22] Filed: Apr. 13, 1979

[51] Int. Cl.³ ............................................. F02D 19/00
[52] U.S. Cl. ................................. 123/25 L; 123/25 R; 123/198 A
[58] Field of Search ................. 123/25 R, 25 A, 25 E, 123/25 L, 1 A, 198 A

[56] References Cited

U.S. PATENT DOCUMENTS

| | | | |
|---|---|---|---|
| 2,509,648 | 5/1950 | Mock | 123/25 A |
| 2,599,985 | 6/1952 | Fox et al. | 123/25 R |
| 3,845,745 | 11/1974 | Dunlap et al. | 123/25 L |
| 3,970,052 | 7/1976 | Andoh | 123/25 R |
| 4,062,327 | 12/1977 | Knights | 123/25 R |
| 4,125,092 | 11/1978 | Inamura | 123/25 L |
| 4,204,481 | 5/1980 | Malec | 123/1 A |

FOREIGN PATENT DOCUMENTS 220670  11/1958  Australia ............................ 123/25 A Primary Examiner—P. S. Lall
Attorney, Agent, or Firm—Sughrue, Mion, Zinn, Macpeak and Seas

[57] ABSTRACT

A fuel additive injection device for injecting an additive into an automotive engine to slow down the burning rate of gasoline while the engine is under heavy load, thereby reducing knocking or pre-ignition while increasing engine output power and increasing fuel mileage. A vacuum chamber having a diaphragm therein is connected to the intake manifold of the engine so that the diaphragm moves back and forth as the pressure in the intake manifold changes. A connecting rod is coupled to the side of the diaphragm opposite to the interior of the chamber. A needle valve connected to the diaphragm through a control rod and a connecting rod and positioned through a valve seat in a flow control passage regulates the flow of additive into the intake manifold of the engine, preferably through the throat of the carburetor. When the pressure in the chamber increases corresponding to a heavy engine load, the needle valve opens increasing the flow of additive to the engine which in turn reduces the burning rate. A second needle valve can be added, operated by the same control rod, for controlling the flow of the second fuel additive wherein the second fuel additive increases the burning rate of the engine fuel at high engine speeds.

3 Claims, 2 Drawing Figures

FUEL ADDITIVE INJECTION DEVICE

BACKGROUND OF THE INVENTION

Modern-day automotive engines, as is generally well known, are subject to engine knocking or pinging due to pre-ignition at low revolution rates for heavy loads due to a problem in the fuel burning rate. That is, most grades of gasoline have a burning rate which is optimized for cruising speeds corresponding to generally high engine revolution rates. The rate of burning, in regular grades of gasoline, is controlled by the addition of tetraethyl lead. For "no-lead" grades of gasoline, an additive such as octane is employed. The amount added is usually a compromise between good power and low revolution rates and good fuel economy at cruise speeds. It is generally not possible to produce a gasoline which has the correct burning rate for both.

It is accordingly an object of the present invention to provide a device to be used with an automotive engine which injects a fuel additive into the engine which controls the rate of fuel burning over the entire sprectrum of engine speeds so as to maximize engine power without knocking at low speeds while maintaining very good fuel economy at higher engine speeds.

Moreover, it is an object of the invention to provide such an injector device which permits the utilization of a low grade of gasoline which has little or no of the costly additives which have heretobefore been necessary.

SUMMARY OF THE INVENTION

These, as well as other objects of the invention, may be met by a device for injecting a fuel additive into the intake system of an automotive engine wherein the amount of fuel additive injected is dependent upon engine load conditions, comprising a sealed chamber which is adapted to be operatively connected to a source of vacuum such as the intake manifold of the engine, a movable diaphragm positioned so as to form one wall of the chamber wherein the center portion of the diaphragm moves in response to changes in pressure in the chamber, a control rod connected to the diaphragm on the side thereof opposite the chamber, an inlet passage for supplying a fuel additive fluid, a fluid control passage in fluid communication with the inlet passage, a valve seat formed within the fluid control passage with the control rod extending though an aperture in the valve seat and a valve control member coupled to the control rod adjacent the valve seat which operates so that changes in pressure in the chamber move the control rod and the valve control member so as to control the flow of additive through the control passage. Preferably, the valve control member is disposed on the side of the valve seat opposite the chamber. It includes a flared portion coupled to the control rod which increases in diameter in a direction away from the chamber.

An adjustable needle valve may be provided for regulating the flow rate of the fuel additive fluid through the flow control passage. A pump is provided for moving the fluid through the flow control passage to the intake manifold of the engine. In the preferred embodiment, a connecting rod couples the control rod to the diaphragm while a seal surrounding a portion of the control rod seals off the flow of fuel additive fluid from the control passage into the region behind the diaphragm. A spring may be positioned within the chamber biasing the diaphragm in the direction of the connecting rod.

In another embodiment of the invention, a second flow control passage is provided so that a second fuel additive fluid can also be injected into the engine. This second fuel additive fluid is preferably an additive which increases the burning rate of the gasoline at cruising speeds. In this case, the flow rate of the fluid is increased for higher engine speeds. The second flow control passage is connected in series with the first flow control passage while the second inlet passage is connected to the second flow control passage for supplying the second fuel additive fluid. A valve seat is formed within the second flow control passage and a second valve control member, also coupled to the control rod, is positioned adjacent the second valve seat. In this embodiment, a decrease in pressure in the chamber decreases the flow of the first fuel additive fluid while simultaneously increasing the flow of the second fuel additive fluid while an increase in pressure in the chamber, corresponding to an increase in engine load, increases the flow of the first fuel additive fluid while simultaneously decreasing the flow of the second additive fluid. The second valve control member may also include a flared portion decreasing in diameter in the direction away from the chamber. A second adjustable needle valve may also be provided for regulating the flow rate of the second fuel additive fluid.

A BRIEF DESCRIPTION OF THE DRAWINGS

DESCRIPTION OF THE PREFERRED EMBODIMENTS

Figure 1:
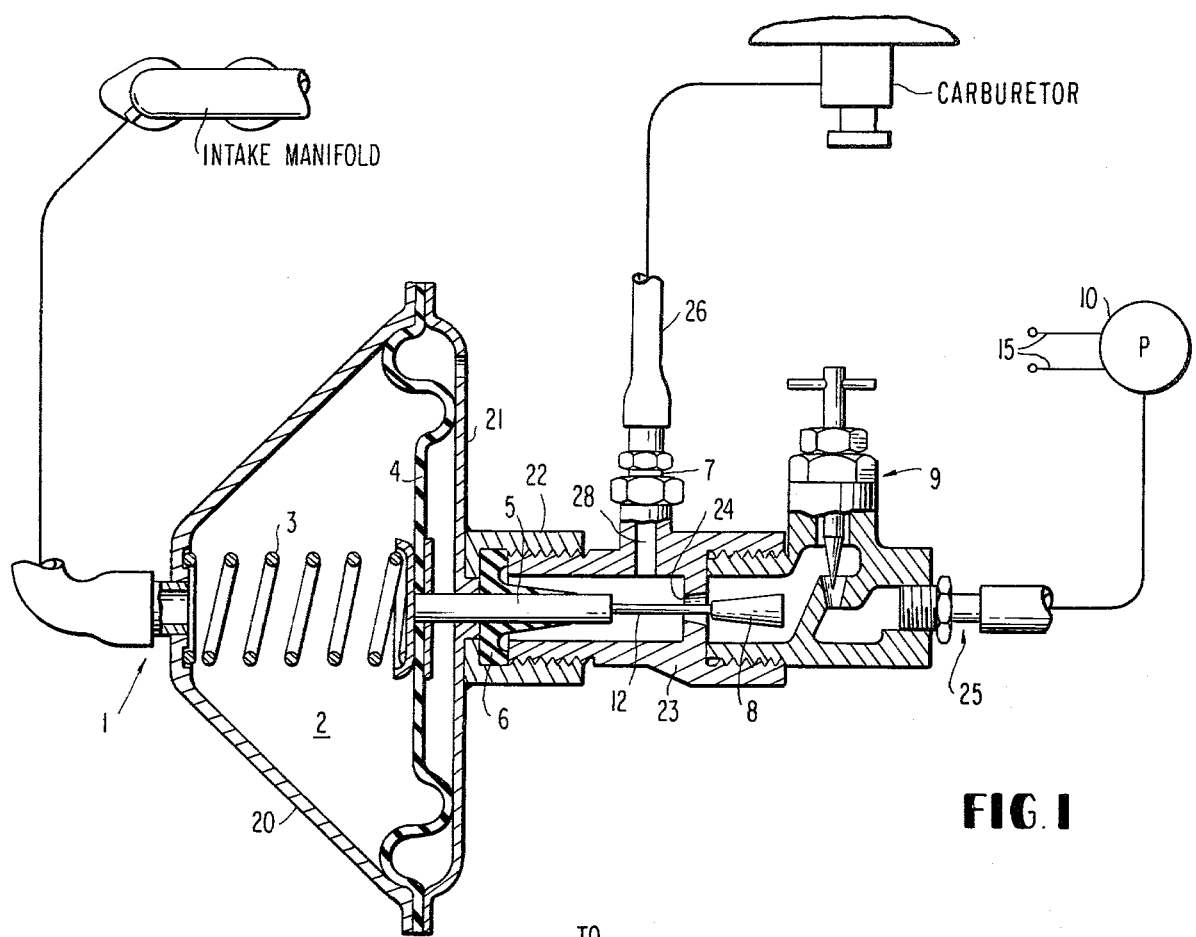
FIG. 1 shows a cross-sectional view of the first embodiment of a fuel additive injection device constructed in accordance with the present invention.

Referring first to FIG. 1, there is shown a first embodiment of a fuel additive injection device constructed in accordance with the teachings of the present invention. A vacuum chamber 2 is formed in a space between conically shaped wall 20 and diaphragm 4. The chamber to the right of diaphragm 4 is closed off by metal wall 21. Connection is made to the interior of vacuum chamber 2 through hose connection 1 located at the peak of chronicle wall 20. Diaphragm 4 is biased to the right by coil spring 3 positioned in the interior of vacuum chamber 2.

Connecting rod 5 is attached to diaphragm 4 at the side thereof opposite the interior of vacuum chamber 2 and extends outward through threaded connection member 22. Rubber seal 6 surrounds a portion of connecting rod 5 to prevent fluid flow back into the chamber between diaphragm 4 and wall 21. A control rod 12 is connected to connecting rod 5 as an extension thereof. A flow control passage member 23 is connected to connection member 22 and positioned around control rod 12.

Flow control passage member 23 includes a valve seat 24 formed at its right end. Flared valve control member 8 is connected at the right-hand end of control rod 12 and is adapted to open and close the passage through valve seat 24 depending upon the longitudinal position of control rod 12. An additive inlet passage 28 intersects flow control passage member 23 near the longitudinal center.

An adjustable needle valve 9 is connected to the inlet passage member 23 with a hose connection member 25 attached to the inlet thereof.

Additive outlet passage 28 connects with connection member 7 which is coupled through rubber hose 26 so that the additive may enter the stream of the fuel-air mixture. Preferably, this connection is made at the throat of the carburetor of the engine. If the particular engine with which the device is to be used employs fuel injection so that there is no carburetor, the outlet of fuel pump 10 can instead be connected directly to the intake manifold of the engine. Inlet connection member 25 is connected through hose 12 to the outlet of fuel pump 10. The inlet of fuel pump 10 is coupled through rubber hose 14 to the reservoir of additive, not shown.

Operationally, when the engine is operating at idling or cruise speed, a vacuum is formed within vacuum chamber 2. This pulls the center of diaphragm 4 to the left against the force of spring 3 pulling with it connecting rod 5 and control rod 12. This in turn draws flared valve control member 8 tight against valve seat 24 thereby blocking the flow of the additive fluid through flow control passage member 23.

When the load on the engine increases, the vacuum in the intake manifold and hence vacuum chamber 2 decreases thus allowing diaphragm 4 to move towards the right urged by the force of coil spring 3. Connecting rod 5 and control rod 12 also move to the right moving flared valve control member 8 away from valve seat 24. The additive fluid is then permitted to flow through additive outlet connection 7. The greater the load on the engine, the higher will be the pressure within vacuum chamber 2 and the further open will be the valve formed between valve seat 24 and valve control member 8.

To the extent permitted by adjustable needle valve 9, the additive fluid flows through connection 25 and hose 12 to the fuel-air intake system of the engine. Adjustable needle valve 9 should be set to control the maximum desired rate of flow of the additive fluid corresponding to the maxiumum load on the engine.

For the additive, a mixture of any of the alcohols with water and a water soluble oil is preferred. For example, excellent results have been obtained with a mixture of 1 qt. of ethanol and 4 cc of a water soluble oil to one gallon of water. Also, common windshield washer fluid diluted two to one with water will work as well. Adequate results can also be obtained by using only water.

Figure 2:
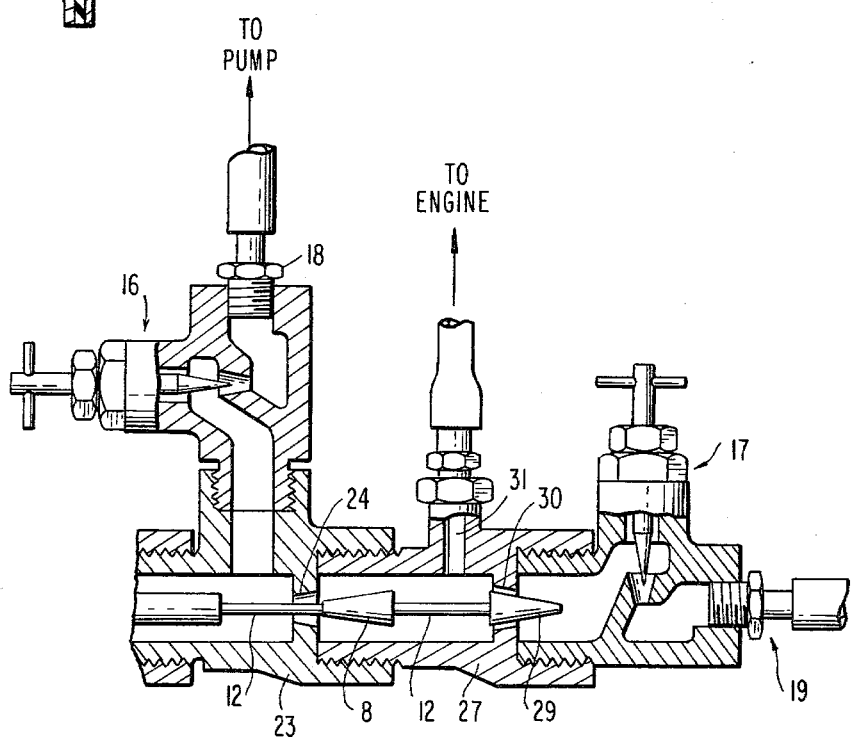
FIG. 2 is a cross sectional view showing a modification of the device shown in FIG. 1.

Referring next to FIG. 2, there is shown a cross sectional view of a modified version of the device shown in FIG. 1. In this view, the vacuum chamber and fuel pump and direct connections thereto have been omitted as they are the same as in FIG. 1. In this version, a second fuel additive fluid is added to the flow stream along with the burning rate retarding additive fluid added with the device shown in FIG. 1.

In this version, control rod 12 extends beyond flow control passage member 23 through the center of a second flow control passage member 27. A second flared valve control member 29 is positioned at the end of control rod 12 adjacent a second valve seat 30 formed at the right-hand end of second flow control passage member 27. The outlet connection is made through outlet passage 31 which intersects second flow control passage member 27.

Additive inlet connection member 18 of needle valve 16 is connected to a reservoir of the burning rate retarding additive fluid described above. The maximum flow rate of this fluid is set by adjusting needle valve 16. The outlet of needle valve 16 communicates with the interior of first flow control passage member 23.

Additive inlet connection member 19 of needle valve 17 is connected to a reservoir of a second additive, this one being an additive which increases the engine power and hence fuel economy at cruising speeds. Additives such as hydrogen or nitro-methane or a mixture of either of these with oxygen may be used. A flow regulator may be connected between additive inlet connection member 19 and the second reservoir. The maximum flow rate of this additive fluid is controlled by the setting of needle valve 17. The outlet of needle valve 17 is in communication with the interior of second flow control passage member 27.

Operationally, when the engine is running under a heavy load, as before, the movement of diaphragm 4 within vacuum chamber 2 causes the valve formed between valve seat 24 and flared valve control member 8 to open increasing the flow of the burning rate retarding additive fluid through hose 12 to intake of air fuel mixture. However, now when the engine is running at cruising speeds without a heavy load applied thereto, the first valve closes as before but the second valve, formed between valve seat 30 and second flared valve control member 29, opens allowing the power increasing additive fluid to flow through needle valve 17. When the engine is operating under a heavy load, the second valve is substantially closed.

This completes the description of the preferred embodiments of the invention. Although preferred embodiments have been described, it is believed that numerous modifications and alterations thereto would be apparent to one having ordinary skill in the art without departing from the spirit and scope of the invention.

What is claimed is:

1. A device for injecting a fuel additive into the intake system of an automotive engine, the amount of fuel additive injected being dependent upon engine load conditions, comprising in combination:

a vacuum chamber, said chamber being adapted to be operatively connected to a source of vacuum in an intake manifold of said engine;

a movable diaphragm, said diaphragm forming one wall of said chamber such that said diaphragm moves in response to changes in pressure in said chamber;

a bias spring in said chamber urginig said diaphragm in one direction;

a control rod connected to said diaphragm on the side thereof opposite said chamber;

an adjustable inlet passage for supplying a fuel additive fluid;

a pump for delivering said fuel additive under pressure;

a flow control passage in fluid communication with said inlet passage for supplying additive into said intake system;

a tapered valve seat formed within said flow control passage, said control rod extending through an aperture in said valve seat;

a fixed valve control member coupled to said control rod and disposed relative to said valve seat to engage therewith and comprising a flared portion which uniformly increases in diameter in a direction away from said chamber to match the taper of said valve seat, wherein changes in pressure in said chamber move said control rod and said valve control member to control the flow of said additive through said flow control passage;

a second flow control passage connected in series with said first-mentioned flow control passage and joined thereto by a mixing chamber;

a second inlet passage connected to said second flow control passage for supplying a second fuel additive fluid;

a second tapered valve seat formed within said second flow control passage;

a second flared valve control member coupled to said control rod in series with said first flared control member and positioned in said mixing chamber relative said second valve seat;

said first flared control member positioned in said mixing chamber in a back-to-back relationship with said second flared control member;

wherein a decrease in pressure in said chamber decreases the flow of said first-mentioned fuel additive fluid while simultaneously increasing the flow of said second fuel additive fluid and an increase in pressure in said chamber increases the flow of said first-mentioned fuel additive fluid while simultaneously decreasing the flow of said second additive fluid.

2. The fuel additive injection device of claim 1 wherein said second flared valve control member comprises a flared portion decreasing in diameter in said direction away from said chamber.

3. The fuel additive injection device of claim 1 further comprising a second adjustable needle valve connected for regulating the flow rate of said second fuel additive fluids.

* * * * *